(12) United States Patent
Davydov et al.

(10) Patent No.: US 11,214,741 B2
(45) Date of Patent: Jan. 4, 2022

(54) FLUID CATALYTIC CRACKING PROCESS FOR CRACKING MULTIPLE FEEDSTOCKS

(71) Applicant: UOP LLC, Des Plaines, IL (US)

(72) Inventors: Lev Davydov, Northbrook, IL (US); Robert Mehlberg, Wheaton, IL (US); Matthew R. Wojtowicz, Carpentersville, IL (US); Patrick D. Walker, Park Ridge, IL (US); Sakthivelan Maadasamy Durai, Gurgaon (IN); Sathit Kulprathipanja, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/801,019

(22) Filed: Feb. 25, 2020

(65) Prior Publication Data

US 2021/0261870 A1 Aug. 26, 2021

(51) Int. Cl.
*C10G 11/18* (2006.01)
*B01J 8/18* (2006.01)
*B01J 8/36* (2006.01)

(52) U.S. Cl.
CPC ........... *C10G 11/187* (2013.01); *B01J 8/1818* (2013.01); *B01J 8/1845* (2013.01); *B01J 8/36* (2013.01); *C10G 11/18* (2013.01); *C10G 11/182* (2013.01); *C10G 2300/1037* (2013.01); *C10G 2300/701* (2013.01)

(58) Field of Classification Search
CPC ......... C10G 11/18; C10G 11/187; B01J 8/18; B01J 8/1809; B01J 8/1845
See application file for complete search history.

(56) References Cited

U.S. PATENT DOCUMENTS

| | | | |
|---|---|---|---|
| 7,670,478 B2 * | 3/2010 | Swan, III | B01J 4/002 208/113 |
| 8,685,232 B2 | 4/2014 | Mandal et al. | |
| 8,986,617 B2 | 3/2015 | Lummus | |
| 9,238,209 B2 | 1/2016 | Couch | |
| 9,522,376 B2 | 12/2016 | Peterman | |
| 2008/0081006 A1 | 4/2008 | Myers | |
| 2011/0198267 A1 | 8/2011 | Couch et al. | |
| 2012/0296146 A1 | 11/2012 | Mehlberg et al. | |

OTHER PUBLICATIONS

Search Report and Written Opinion for PCT/US2021/019005 dated May 18, 2021.

* cited by examiner

*Primary Examiner* — Renee Robinson
(74) *Attorney, Agent, or Firm* — Paschall & Associates, LLC; James C. Paschall

(57) ABSTRACT

A fluid catalytic cracking (FCC) process for cracking multiple feedstocks in a FCC apparatus comprising a first set of feed distributors having first distributor tips and a second set of feed distributors having second distributor tips is provided. A first feed is injected into the riser from first distributor tips. A second feed is injected into the riser from second distributor tips. The first distributor tips and the second distributor tips are positioned at different radii in the riser. The first feed and the second feed are cracked in the riser in the presence of an FCC catalyst to provide a cracked effluent stream. The first distributor tips and the second distributor tips are located into a region of lower catalyst density and a region of higher catalyst density respectively in the riser.

20 Claims, 5 Drawing Sheets

FLUID CATALYTIC CRACKING PROCESS FOR CRACKING MULTIPLE FEEDSTOCKS

FIELD

The field relates to process for catalytic cracking of hydrocarbons. Particularly, the field relates to a fluid catalytic cracking process for cracking multiple feedstocks.

BACKGROUND

Fluid catalytic cracking (FCC) is a catalytic conversion process for cracking heavy hydrocarbons into lighter hydrocarbons by bringing the heavy hydrocarbons into contact with a catalyst composed of finely divided particulate material in a fluidized reaction zone. As the cracking reaction proceeds, substantial amounts of highly carbonaceous material, referred to as coke, are deposited on the catalyst, forming spent catalyst. High temperature regeneration burns the coke from the spent catalyst. The regenerated catalyst may be cooled before being returned to the reaction zone. Spent catalyst is continually removed from the reaction zone and replaced by essentially coke-free catalyst from the regeneration zone.

The basic components of the FCC process include a riser, a reactor vessel, a catalyst stripper, and a regenerator. In the riser, a feed distributor injects the hydrocarbon feed which contacts the catalyst and is cracked into a product stream containing lighter hydrocarbons. An inert lift gas such as steam may be used to accelerate catalyst in a lower section of the riser below or during introduction of the feed. The lift velocity refers to the velocity of the inert gas and the lifted catalyst just before feed distribution into the catalyst and lift gas. Catalyst and hydrocarbon feed are transported upwardly in the riser by the expansion of the gases that result from the vaporization of the hydrocarbons and other lift and dispersion media as well as molar expansion of cracked products upon contact with the hot catalyst. Coke accumulates on the catalyst particles as a result of the cracking reaction, and the catalyst is then referred to as "spent catalyst." The reactor vessel disengages spent catalyst from product vapors. The catalyst stripper removes adsorbed hydrocarbons from the surface of the catalyst. The regenerator burns the coke from the catalyst and recycles the regenerated catalyst into the riser.

A problem encountered during the FCC process is distributing the feed in the riser so that it can adequately mix with the catalyst. Adequate mixing is usually necessary for efficient conversion of the feed. Usually, a higher severity of operation is required for heavier feeds to achieve the same degree of conversion in the FCC process as lighter feeds. A heavy VGO (HVGO) stream and a light VGO (LVGO) stream are drawn from two distinct levels from a vacuum distillation unit (VDU). Usually, these two different streams, despite having substantial difference in hydrogen content, are blended together upstream of the FCC process. Also, refineries equipped with feed hydroprocessing units or residue deasphalters sometimes blend lighter mild hydrocracked unconverted oil (MHC UCO) and heavier deasphalted oil (DAO) components with their main FCC VGO feed. Yet other refiners recycle their main column bottoms (MCB), heavy cycle oil (HCO) or light cracked naphtha back to the riser to improve the coke yield from the unit, but such operation usually imparts little to enhance yields of valuable products. Some other refiners recycle light cracked naphtha (LCN) back to the riser to improve light olefin yields.

Processing a heavy residue or resid feed in an FCC unit poses unique challenges due to the high density, high boiling point nature of the resid feed. Specifically, good distribution of resid feed into the riser and rapid mixing with the catalyst in the riser is difficult. Usually, good distribution of resid feed is enhanced by high feed temperature, high pressure drop, high atomizing steam and blending with a gasoline boiling range feed (or recycle) to decrease viscosity of the feed. However, each of these remedies pose problems. E.g., a high feed temperature will reduce the catalyst-to-oil ratio, high pressure drop will result in higher utility costs, high atomizing steam will occupy space in the riser, reactor and main fractionator which could otherwise be used for additional feed capacity, blending with a gasoline boiling range feed to cut the viscosity will also occupy space and suppress overall conversion as gasoline boiling range feed does not convert in an FCC unit to the same degree as resid feed. Also, location of injection of the feed into the riser plays a critical role in the extent of cracking of feed to the riser and selectivity of the desired product.

Accordingly, there is a need for an alternative FCC process and apparatus for cracking multiple feedstocks simultaneously in the FCC riser. Particularly, there is a need of an FCC process and apparatus with improved feedstock distribution and mixing with the fluid catalytic cracking catalyst for cracking multiple feedstocks simultaneously in the riser. Other desirable features and characteristics of the present subject matter will become apparent from the subsequent detailed description of the subject matter and the appended claims, taken in conjunction with the accompanying drawing and this background of the subject matter.

BRIEF SUMMARY

Various embodiments contemplated herein relate to FCC processes and apparatuses.

The exemplary embodiments taught herein provide an FCC process for cracking multiple feedstocks in a fluid catalytic cracking apparatus.

In accordance with an exemplary embodiment, an FCC process for cracking multiple feedstocks in a FCC apparatus comprising a riser is provided. The riser may comprise a first set of feed distributors having first distributor tips and a second set of feed distributors having second distributor tips positioned around the perimeter of the riser. The process comprises injecting from the first distributor tips of the first set of feed distributors, a first feed into the riser. A second feed may be injected into the riser from the second distributor tips of the second set of feed distributors. In an embodiment, the first distributor tips may be positioned at a first radius in the riser and the second distributor tips may be positioned at a second radius in the riser. The first feed and the second feed may be cracked in the riser in the presence of an FCC catalyst to provide a cracked effluent stream. In an embodiment, the first distributor tips and the second distributor tips may be positioned at a same elevation around the perimeter of the riser. In another embodiment, the first distributor tips and the second distributor tips may be positioned at different elevations around the perimeter of the riser. In an exemplary embodiment, the second distributor tips of the second set of feed distributors are spaced apart from the first distributor tips of the first set of feed distributors at a vertical distance of no more than about one inner diameter of the riser. In accordance with the present process, the region of lower catalyst density may be an inner center region in the riser and the region of higher catalyst density may be an outer annular region in the riser. In an exemplary embodiment, the second feed may be less crackable than the first feed.

The process of the present disclosure envisages providing an improved feedstock distribution and mixing with the FCC catalyst in the riser by segmented distribution of multiple feedstocks into the riser. Further, the process of the present disclosure envisages two distinct zones within the riser without the need of any physical barrier. The feedstocks may be passed to the distinct zones within the riser based on their severity. Accordingly, the present process provides cracking of multiple feedstocks within the riser with an improved feedstock distribution and mixing of the feedstocks with the FCC catalyst in the riser. The FCC process of the present disclosure also provide flexibility in terms of handling of multiple feedstocks.

These and other features, aspects, and advantages of the present disclosure will become better understood upon consideration of the following detailed description, drawings and appended claims.

BRIEF DESCRIPTION OF THE DRAWING

The various embodiments will hereinafter be described in conjunction with the following FIGURE, wherein like numerals denote like elements.

DEFINITIONS

Figure 1:
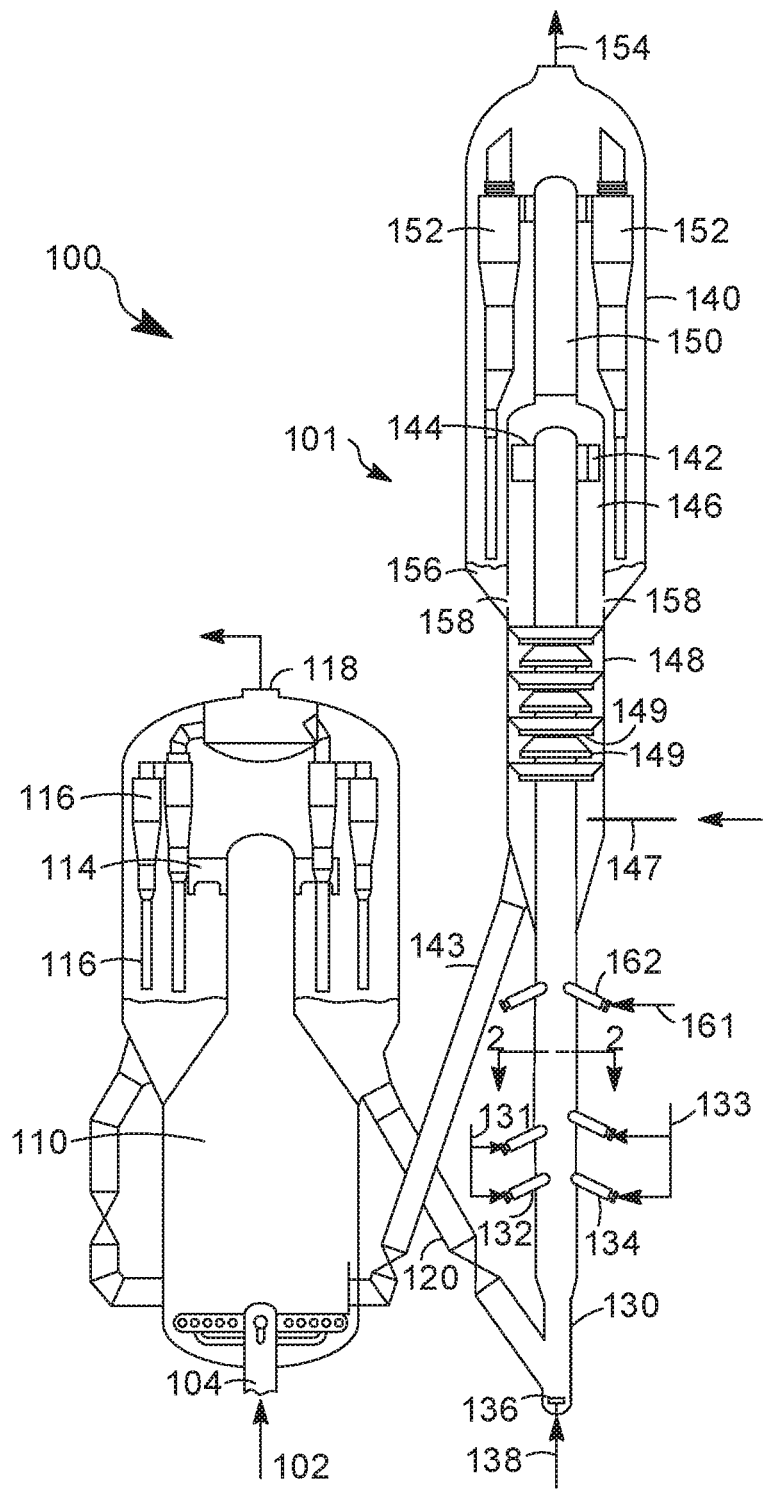
FIG. 1 is a schematic diagram of an FCC process and an FCC apparatus for cracking multiple feedstocks in accordance with an exemplary embodiment.

As used herein, the term "column" means a distillation column or columns for separating one or more components of different volatilities. Unless otherwise indicated, each column includes a condenser on an overhead of the column to condense the overhead vapor and reflux a portion of an overhead stream back to the top of the column. Also included is a reboiler at a bottom of the column to vaporize and send a portion of a bottom stream back to the bottom of the column to supply fractionation energy. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column. Alternatively, a stripping stream may be used for heat input at the bottom of the column.

As used herein, the term "bottoms stream" or "bottoms" can mean a stream withdrawn in a line extending from or near a bottom of a vessel, such as a column.

As used herein, the term "passing" includes "feeding" and "charging" and means that the material passes from a conduit or vessel to an object.

As used herein, the term "portion" means an amount or part taken or separated from a main stream without any change in the composition as compared to the main stream. Further, it also includes splitting the taken or separated portion into multiple portions where each portion retains the same composition as compared to the main stream.

As used herein, the term "unit" can refer to an area including one or more equipment items and/or one or more sub-units. Equipment items can include one or more reactors or reactor vessels, heaters, separators, drums, exchangers, pipes, pumps, compressors, and controllers. Additionally, an equipment item, such as a reactor, dryer, or vessel, can further include one or more units or sub-units.

The term "communication" means that material flow is operatively permitted between enumerated components.

The term "downstream communication" means that at least a portion of material flowing to the subject in downstream communication may operatively flow from the object with which it communicates.

The term "$C_x$" wherein "x" is an integer means a hydrocarbon having x carbon atoms.

The term "$C_{x+}$" wherein "x" is an integer means a hydrocarbon having x and/or less carbon atoms and preferably x and less carbon atoms.

The term "$C_{x-}+$" wherein "x" is an integer means a hydrocarbon having x and/or more carbon atoms and preferably x and more carbon atoms.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator. The separator may be operated at higher pressure than the flash drum.

As used herein, the term "stream can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons.

As used herein, the term "zone' may refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "fluid catalytic cracking" may be abbreviated herein as "FCC.

As used herein, the term "spent catalyst" can refer to catalyst particles having accumulated coke as a result of a cracking reaction.

As used herein, the term "crackable" can refer to the reactivity of the feed to cracking. Crackability of a feed can be decided based on the UOP Characterization Factor "K" or UOP K, hydrogen content, olefin concentration or molecular weight of the feed. For feed having at least 10 wt % C11+ hydrocarbons, crackability depends on UOP K, wherein a higher UOP K signifies higher crackability. For feed having less than 10 wt % C11+ hydrocarbons, crackability depends on olefin concentration, molecular weight, or hydrogen content of the feeds in that order.

As used herein, the term "UOP K" can be determined from UOP Method 375 which is a common measure of the quality of gas oil, cycle oil and residuum feeds. Feeds with a higher UOP K are more crackable as they contain higher concentrations of more reactive paraffin chains and lower concentrations of less reactive aromatics.

DETAILED DESCRIPTION

Applicants have found that core-annular flow taking place throughout a significant length of the riser length creates a zone of higher severity around the periphery of the riser defined herein as an outer annular region. Also, there is a formation of a zone of lesser severity within the riser defined herein as an inner center region. Thus, two distinct zones are generated within the riser 130 without any physical barrier therebetween. The zone of higher severity around the periphery of the riser or outer annular region may be characterized by a higher catalyst to oil ratio and higher temperature due to higher catalyst concentration present therein. Particularly, the outer annular region is characterized by a higher catalyst density or concentration compared to the inner center region. At the same time, feed in lower sections of the riser experiences higher temperature and higher catalyst density due to lower conversion which entails lower vapor velocity and higher catalyst density.

Applicants take advantage of these findings to distribute multiple feeds simultaneously within the riser 130 of an FCC unit at locations suited to the crackability of the feeds. Based on the crackability of the feeds, a more crackable feed may be passed to the inner center region of lesser severity. Unlike current practice of passing multiple feeds through a single feed line after blending, applicants' process provides passing the multiple feeds into the riser through separate feed lines into region of different catalyst concentrations based on the crackability of the feeds to provide an improved feedstock distribution of the feeds to the FCC catalyst in the riser 130. A less crackable feed may be passed to the outer annular region of higher severity for cracking and the more crackable feed may be simultaneously passed to the inner center region of lesser severity. Passing different feeds into the riser 130 based on their crackability enables a less crackable feed to be severely cracked but a comparatively more crackable feed may not be as severely cracked. The process and apparatus results in superior overall catalyst to feed contacting in the riser 130 without the overall penalty caused by high feed temperature, high steam rate, high utility costs and high gasoline boiling range blending feedstock compared to the current practice.

The following detailed description is merely exemplary in nature and is not intended to limit the various embodiments or the application and uses thereof. Furthermore, there is no intention to be bound by any theory presented in the preceding background or the following detailed description. The figures have been simplified by the deletion of a large number of apparatuses customarily employed in a process of this nature, such as vessel internals, temperature and pressure controls systems, flow control valves, recycle pumps, etc. which are not specifically required to illustrate the performance of the process. Furthermore, the illustration of the current process in the embodiment of a specific drawing is not intended to limit the process to specific embodiments set out herein.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

An FCC process for cracking multiple feedstocks in an FCC apparatus is addressed with reference to a process and an apparatus 100 according to an embodiment as shown in FIG. 1. Referring to FIG. 1, the process and apparatus 100 comprise an FCC apparatus 101 comprising a riser 130. The riser 130 may have multiple sets of feed distributors to inject multiple feedstocks into the riser. In an exemplary embodiment, the riser may comprise a first set of feed distributors 132 having first distributor tips and a second set of distributors 134 having second distributor tips positioned around the perimeter of the riser 130.

Multiple feedstocks may be injected by the two set of distributors; viz., the first set of feed distributors 132 and the second set of feed distributors 134 through their respective tips positioned around the perimeter of the riser 130. The first set of feed distributors 132 and the second set of feed distributors 134 may comprise a plurality of feed distributors for injecting feedstocks. Separate feed lines may be used to inject different feeds separately into the riser 130 for cracking. In an embodiment, two separate feed lines may be used to inject two separate feeds into the riser 130.

In an exemplary embodiment, a first feed supplied by a first feed line 131 and a second feed supplied by a second feed line 133 may be injected into the riser 130 and cracked in the presence of an FCC catalyst. The first feed may be injected into the riser 130 via the first distributor tips of the first set of feed distributors 132 and the second feed may be injected into the riser via the second distributor tips of the second set of feed distributors 134.

In the riser 130, the first feed and the second feed contact a lift gas and the FCC catalyst. Any suitable inert gas can be used as the lift gas. The lift gas may be passed in line 138 and introduced in the riser 130 by a lift gas distributor 136. In an exemplary embodiment, steam may be passed as the lift gas in line 138 and distributed by the lift gas distributor 136 into the riser 130. The first feed supplied by the first feed line 131 and the second feed supplied by the second feed line 133 may be cracked in the riser 130 in the presence of the FCC catalyst to provide a cracked effluent stream. The first distributor tips of the first set of feed distributors 132 and the second distributor tips of the second set of feed distributors 134 may be located at different radial positions or radii inside the riser 130 to inject different feeds into the riser. Based on their crackability, the first feed from the first set of feed distributors 132 and the second feed from the second set of feed distributors 134, may be injected into two separate catalyst concentration/density regions within the riser 130 to provide an improved feedstock distribution and mixing with the FCC catalyst in the riser 130.

Crackability of a feed generally trends proportionally to olefinicity, molecular weight and hydrogen content. Crackability decreases with aromaticity or aromatic concentration of the feeds which relates to hydrogen content. For heavier feeds comprising at least 10 wt % C11+ hydrocarbons, more crackable feed is proportional to the UOP K factor which accounts for olefinicity, molecular weight and hydrogen content. Heavier feeds that may include residuum and gas oil have a higher UOP K than, for example, cycle oils feeds. Further, coker gas oil may be characterized as a heavy less crackable feed due to its lower UOP K and will require processing at higher severity. Moreover, HCO, MCB or DAO may have an API gravity of from about −5 to about 10 and a lower UOP K indicating that they are less crackable. For lighter feeds with less than 10 wt % C11+ such as LPG and naphtha, crackability increases with olefinicity, molecular weight or hydrogen content in that order. Also, an oligomer recycle stream may also be generally deemed a more crackable feed due to its higher olefinicity and specifically characterized per the definition of crackability defined hereinabove.

In an embodiment, the first feed and the second feed may be selected from a group comprising HVGO and HCO, HVGO and MCB, HVGO and DAO, naphtha and C4 olefins, C5+ hydrocarbons and C4 hydrocarbons, and VGO and vacuum resid, respectively. Other pairs of feeds may be selected that have disparate crackabilities. Based on their crackability, the feeds may be characterized as the more crackable feed and the less crackable feed. Feed segmentation in accordance with the process of the present disclosure, aims at processing the more crackable feed components at lower severity and the less crackable feed components at higher severity. In many cases, the less crackable feed has been subject to a cracking process previously; whereas, the more crackable feed has not. As per the crackability, the second feed may be characterized as comparatively less crackable feed as compared to the first feed. In an exemplary embodiment, the second feed may be characterized as less crackable than the first feed.

The first distributor tips of the first set of feed distributors 132 may be located in the region of lower catalyst density in the riser 130, and the second distributor tips of the second set of feed distributors 134 may be located into a region of higher catalyst density in the riser 130. In an exemplary embodiment, the region of lower catalyst density may be an inner center region in the riser 130 and the region of higher catalyst density may be an outer annular region in the riser 130. The catalyst density is directly proportional to the severity.

The second feed may be supplied in the second feed line 133 and injected into the riser 130 via the second set of feed distributors 134 into the outer annular region of higher severity. The first feed supplied by the first feed line 131 may be characterized as comparatively more crackable feed. The first feed may be injected into the inner center region of lower catalyst density in the riser 130. The first feed may be supplied in the first feed line 131 and injected into the riser 130 via the first set of feed distributors 132 into the inner center region of lower severity. Depending on the severity requirement of the second feed, an amount of the first feed may also be co-injected with second feed into the outer annular region of higher severity in the riser 130. In an exemplary embodiment, a portion of the first feed in an amount of from about 50 vol % to 75 vol % of the total feed to the riser may be co-injected with the second feed into the outer annular region of higher severity in the riser 130. Also, depending on the hydrogen content of the first feed, a portion of the first feed can be mixed with the second feed and injected into the riser 130 via the second set of feed distributors 134.

In an exemplary embodiment, HVGO feed may be characterized as comparatively more crackable feed. HVGO feed may be taken in the first feed line 131 and injected into the riser 130 via the first set of feed distributors 132 into the inner center region of lower severity. The second feed may be selected from HCO or MCB or DAO feeds. Alternatively, a predetermined amount of the HVGO feed may be co-injected with the second feed into the outer annular region of higher severity in the riser 130. In an exemplary embodiment, HVGO feed in an amount of from about 50 vol % to 75 vol % of the total feed to the riser may be co-injected with the one or more of second feed into the outer annular region of higher severity in the riser 130. Also, depending on the hydrogen content of the HVGO, HVGO feed may be mixed with the one or more of the second feed and injected into the riser via the second set of feed distributors 134.

In case the second feed requires higher severity, the second feed may be passed via a center feed distributor (not shown) from the bottom of the riser 130. The center feed distributor (not shown) may be positioned at a lower elevation than the first set of distributors 132 and the second set of distributors 134.

Figure 5:
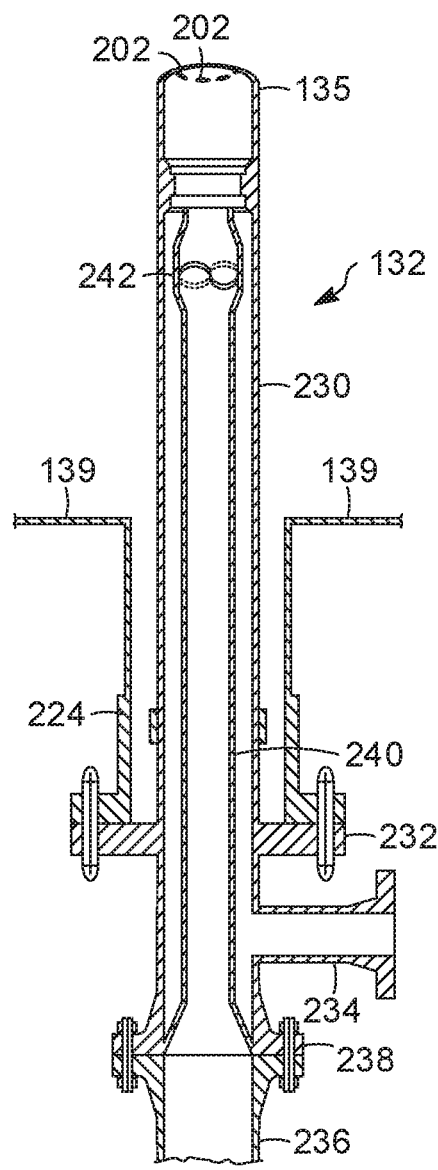
FIG. 5 is a cross-sectional view of a feed distributor in accordance with an exemplary embodiment.

In an embodiment, there may be a third set of feed distributors having third distributor tips positioned around the perimeter of the riser 130 as shown in FIG. 1. The third set of feed distributors may be connected to a third feed line 161. A third feed may be supplied by the third feed line 161 and injected into the riser 130 through the third distributor tips of the third set of feed distributors 162. In an embodiment, the third distributor tips of the third set of feed distributors 162 for injecting the third feed into the riser 130 may be positioned at a higher elevation around the perimeter of the riser 130 than the first set of feed distributors 132 and the second set of feed distributors 134. The third set of feed distributors may have similar configuration as shown in FIG. 5. In an exemplary embodiment, the third set of feed distributors 162 and the first set of feed distributors 132 may have the same configuration.

In an exemplary embodiment, the third feed may be selected from one or more of light vacuum gas oil (LVGO), and unconverted oil (UCO). The third feed can be characterized as comparatively more crackable than the first feed and the second feed. A more crackable feed may be used as the third feed. Thus, third feed may not need high severity for cracking compared to the first feed and the second feed to reach optimal conversion levels. The third feed may be injected at a higher elevation in the riser 130 via the third set of feed distributors 162 than the first set of feed distributors 132 and the second set of feed distributors 134. The third feed may encounter a nominal catalyst-to-oil ratio and a reduced catalyst temperature due to third set of feed distributors 162 positioned close to the top of the riser 134 having a lower riser outlet temperature due to the endothermic nature of catalytic cracking. In accordance with the present process, the third feed may spend more time in the riser at the nominal catalyst-to-oil ratio and the reduced catalyst temperature compared to the first feed and the second feed. In an exemplary embodiment, the third feed may have a residence time from about 0.1 seconds to about 2 seconds in the riser 130. Compared to the third feed and the first feed, the second feed may experience a higher catalyst density and an elevated temperature in the riser 130. Third feed may not need high severity to reach optimal conversion levels in the riser 130. The third feed may spend about 0.1 to about 2 seconds in the riser at nominal catalyst-to-oil ratio and at a reduced catalyst temperature close to the controlled riser outlet temperature. In an exemplary embodiment, the first feed and the second feed may have a residence time from about 1 second to about 5 seconds in the riser 130. The residence time for the feeds may also be defined as the time spent by the feed between the first set of distributors and the third or last set of distributors in the riser. In an exemplary embodiment, this residence time may be about 0.1 to about 1 second. In another exemplary embodiment, the third feed may be a main feed to the riser 130.

Over the time, C3 to C5 olefin yields in an FCC process may become equilibrium limited. Therefore, it may be desirable to recycle C4-C6 hydrocarbons from the FCC process back to the riser 130 to bias selectivity to desirable olefins. However, the riser has limited residence time and C4-C6 hydrocarbons are much less reactive. Particularly, C4 olefins are much less reactive than higher olefins. Accordingly, passing the C4-C6 hydrocarbons to an optimum location in the riser becomes imperative for cracking the C4-C6 hydrocarbons to lower olefins.

Usually, various recycle streams are injected into the riser of the FCC unit to improve the yield of light olefins. The recycle stream may include naphtha. In an embodiment, the recycle stream may include LCN. In a further embodiment, the recycle stream is the second stream 133 and is distributed by the second set of distributors 134.

The recycle stream(s) may be injected at a point below the injection of the third feed injected into the riser 130 through the third set of feed distributors 162. The third feed may include raw oil. By injecting the recycle stream below the third feed, the recycle stream comes first in contact with a hot regenerated catalyst coming through a regenerator standpipe 120. Therefore, the hot regenerated catalyst preferentially cracks the recycle stream first before contacting the raw oil.

Based on their crackability, the recycle streams may be characterized as a more crackable recycle stream and a less crackable recycle stream. In an embodiment, the recycle stream may include one or more of LCN, HCO, DAO, and C4 to C6 hydrocarbons. In an exemplary embodiment, C4 to C6 hydrocarbons may comprise C4 to C6 olefins. In another exemplary embodiment, C4 to C6 hydrocarbons may comprise C4 to C6 paraffins. As per the definition of crackability, C4 to C6 hydrocarbons, being less reactive, may be characterized as less crackable feed as compared to the other recycle streams which may be characterized as more crackable feed. C4 to C6 hydrocarbons may be injected as the second feed into the outer annular region of higher severity through the second set of feed distributors 134 as the second feed in line 133. With respect to C4 to C6 hydrocarbons, C4 hydrocarbons may be characterized as less crackable feed. C5+ hydrocarbons may be characterized as comparatively more crackable feed.

The other recycle streams may be injected as the first feed into the inner center region of lower catalyst density as more crackable feed through the first set of feed distributors 132. In an aspect, both the recycle streams come in contact with the fresh regenerated catalyst at a higher temperature because they are closer to the regenerator standpipe 120. Thus, the current process may distribute multiple recycle streams into the riser 130 of the FCC apparatus 101 to improve the yield of light olefins.

Applicants have found that two distinct zones, the inner center region and the outer annular region are generated in the riser 130. The outer annular region of the riser 130 operates at a lower velocity compared to the inner center region. Further, the catalyst hold-up volume in the outer annular region is much higher compared to the inner center region. Passing the less crackable feed to the outer annular region subjects it to higher severity, higher temperature, higher catalyst-to-oil ratio, higher residence time, higher catalyst density and higher olefin partial pressure than the inner center region. In an exemplary embodiment, the outer annular region may operate at a velocity from about 10 to about 50%, lower than the inner center region In another exemplary embodiment, the outer annular region may operate at a velocity from about 10 to about 20% lower than the inner center region. In yet another exemplary embodiment, the first feed and the second feed may be a LCN recycle stream and a C4 recycle stream or light naphtha and C4 olefins stream, or C5+ hydrocarbons recycle stream and C4 hydrocarbons recycle stream, respectively.

Applicants have found that separate injection of C4 hydrocarbons as the second feed and C5 hydrocarbons as the first feed into the outer annular region and the inner center region, respectively, increases butene partial pressure in the outer annular region and pentene partial pressure in the inner center region. A higher olefin partial pressure drives both butene and pentene conversion. This occurs because the predominant mechanism of butene and pentene cracking over ZSM5 or other MFI or medium pore zeolite is a bimolecular cracking reaction between an adsorbed butene or pentene with a gas phase butene or pentene. The rate of these bimolecular cracking reaction increases with olefin partial pressure.

The third feed selected from one or more of VGO, atmospheric residue and UCO may be passed through the third distributor tips of the third set of feed distributors 162 into the riser 130. VGO may include LVGO or HVGO. The third feed may be injected into the riser 130 at an elevation higher than the recycle streams injected through the first set of feed distributors 132 and/or the second set of feed distributors 134.

Figure 2:
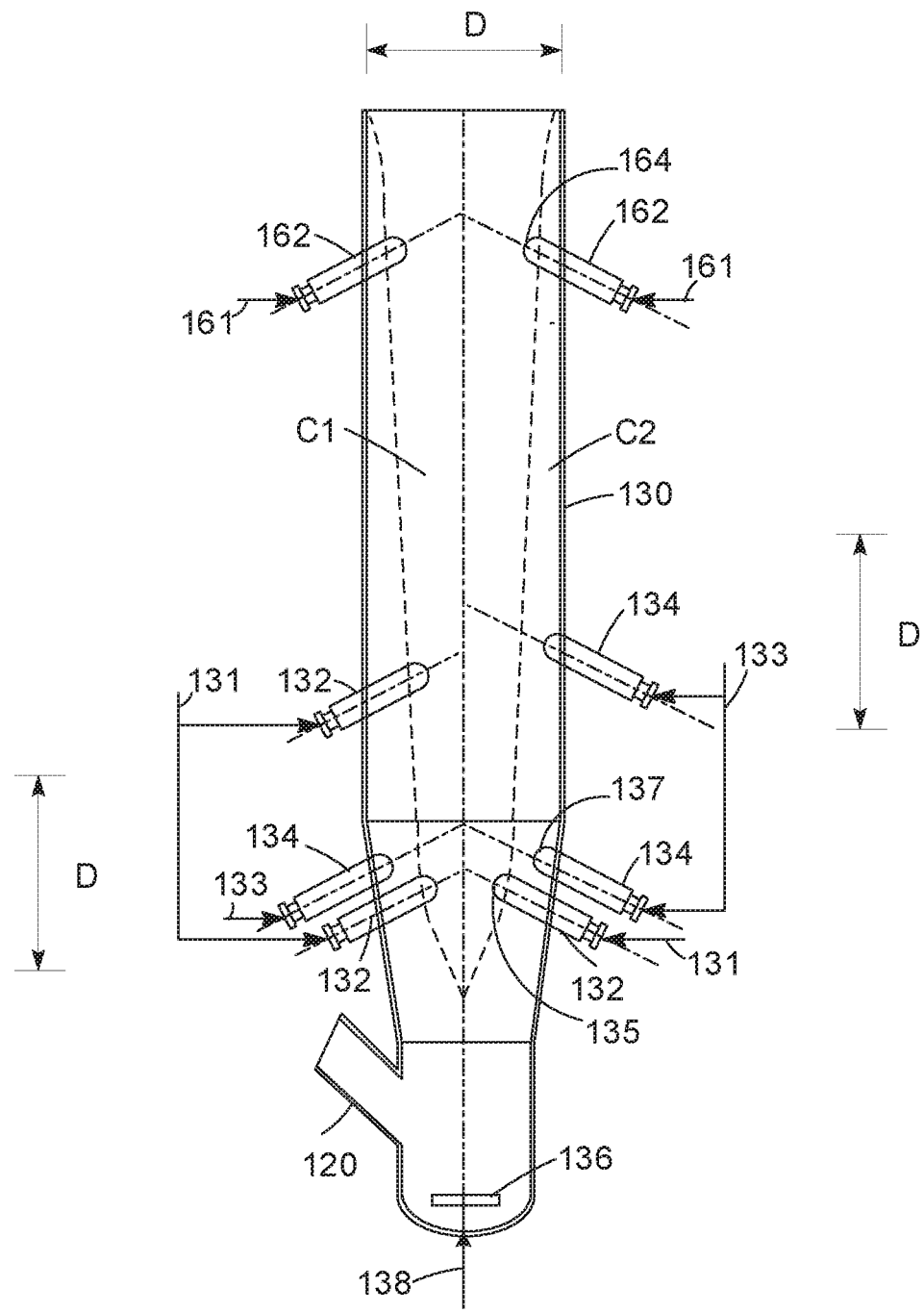
FIG. 2 illustrates the formation of two distinct zones within the riser without the need of any physical barrier in accordance with an exemplary embodiment.

FIG. 2 shows a profile formation within the riser 130 for the catalyst concentration within the riser 130. As shown, there are two distinct zones formed within the riser 130 without any physical barrier, the inner center region C1 and the outer annular region C2. The inner center region C1 may be of lower catalyst density and the outer annular region C2 may be of higher catalyst density. The inner center region C1 of lower catalyst density may be characterized as the region of comparatively low severity. The outer annular region C2 of higher catalyst density may be characterized as the region of comparatively high severity. As shown, the first distributor tips 135 of the first set of feed distributors 132 may be positioned in the inner center region C1 in the riser 130. The second distributor tips 137 of the second set of feed distributors 134 may be positioned in the outer annular region C2 in the riser 130. The third set of feed distributors 162 may be located near the top of the riser 130 to inject the third feed into the riser 130. The third distributor tips 164 of the third set of feed distributors 162 may be positioned in the inner center region C1 of lower catalyst density. As shown, the outer annular region C2 of higher catalyst density gradually reduces towards an upper section of the riser 130 at which the inner diameter of the riser expands. Whereas, the inner center region C1 of lower catalyst density gradually increases towards the upper section of the riser 130 at which the inner diameter of the riser expands. Thus, the profile of the inner center region C1 of lower catalyst density and the outer annular region C2 of higher catalyst density varies along the height of the riser 130. In a lower section of the riser 130, at which the riser may have an inner diameter of no more than 1.3 m (4 ft), core annular flow does not develop, so two distinct zones do not develop.

Figure 3:
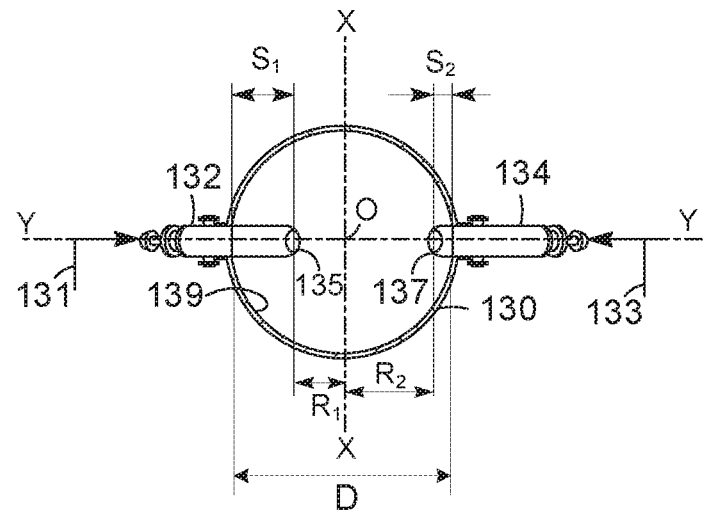
FIG. 3 is a cross sectional view taken along segment 2-2 in FIG. 1 in accordance with an exemplary embodiment.

FIG. 3 shows one embodiment of an arrangement of the first set of feed distributors 132 and the second set of feed distributors 134 illustrating the different radial positions for injecting the first feed and the second feed into the riser 130. For ease of representation, one feed distributor is shown in FIG. 3 for each of the first set of feed distributors 132, and the second set of feed distributors 134. However, there may be multiple feed distributors for each set of feed distributors to inject multiple feeds into the riser 130. The feed distributor 132 has a first distributor tip 135 that penetrates from an inner wall 139 of the riser 130 by a first radial distance to a center of the first distributor tip 135 of S1, and the feed distributor 134 has a second distributor tip 137 that penetrates from the inner wall 139 by a radial distance to a center of the second distributor tip 137 of S2. In an exemplary embodiment, S1 is greater than S2. The difference in penetration between S1 and S2 may be equal to between about 15% and 40% of an inner diameter D of the riser 130 at the elevation of the feed distributors 132, and 134.

As shown, tips 135 and 137 may be located at different radii in the riser 130. The radii may be defined from a center point O of the riser 130. The first distributor tip 135 of the first set of feed distributors 132 may be positioned at a first radius R1 from the center point O of the riser 130. The second distributor tip 137 of the second set of feed distributors 134 may be positioned at a second radius R2 from the center point O of the riser 130. In an exemplary embodiment, the first radius R1 is smaller than second radius R2. In an embodiment, the difference between the first radius and the second radius may be in the range from about 15% to about 40% of the inner diameter D of the riser 130 at the elevation of the feed distributors 132, and 134. Referring to FIG. 3, the space S1 between the tip 135 and the closest portion of the wall 139 may be a distance equal to between about 5% and about 45% of the inner diameter D of the riser 130, or between about 15% and about 35% of the inner diameter D of the riser 130. The inner diameter D may be at least 1.3 m (4 ft). The tips 135 and 137 of each set of feed distributors 132, and 134, respectively, penetrates into the riser at different radial distances from the inner wall 139 of the riser 130.

Figure 4:
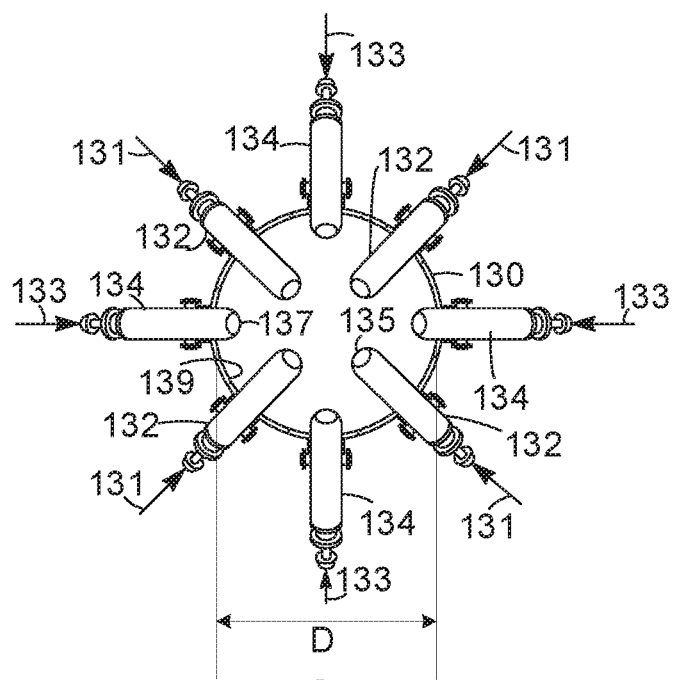
FIG. 4 is an alternative cross-sectional view taken along segment 2-2 in FIG. 1 showing an embodiment with different radial positions between two sets of feed distributors in accordance with an exemplary embodiment.

As shown in FIG. 4, the first set of feed distributors 132 and the second set of feed distributors 134 may include a plurality of feed distributors. FIG. 4 depicts an arrangement of multiple feed distributors 132 and 134 for injecting the first feed via first feed line 131 and the second feed via second feed line 133 through their respective tips into the riser 130.

The first set of feed distributors 132 and the second set of feed distributors 134 may be arranged inside the riser 130 at different radial extensions, and circumferentially spaced generally evenly with respect to inner wall 139 of the riser 130. As shown in FIG. 1, the first set of feed distributors 132 and the second set of feed distributors 134 may penetrate the wall 139 at different elevations.

In an embodiment, the first set of feed distributors 132 and the second set of feed distributors 134 may penetrate the wall 139 at same elevations. The tips 135 and 137 of the first set of feed distributors 132, and the second set of feed distributors 134 respectively may be positioned at the same elevations and in such a way as to avoid adjacent spray impact that could cause undesirable spray interference and prevent catalyst bouncing away from injected feed from one feed distributor to avoid feed injected from another feed distributor and to ensure the most uniform and rapid catalyst-oil contacting as possible. The faster the catalyst and oil are contacted in the riser 130, the more controllable the overall reaction will be. Installing all of the feed distributor tips 135, and 137 on the same horizontal elevation plane may prevent excessive erosion of adjacent feed distributors as a result of the high kinetic energy produced from flashing feed in a fluidized solids environment.

Feed distributors 132, 134 may have differing or the same capacities and may distribute different flow rates of their respective feeds to different areas within the riser 130 to optimize coverage across the riser 130. Feed distributors typically inject hydrocarbon feed and inert dispersion gas, such as steam, at a rate of 52-76 m/s (170-250 ft/s). The differing flow rates may range from about 30 wt % to 200 wt % of the average feed distributor capacity, preferable about 60 wt % to about 150 wt %.

FIG. 5 shows a detail of the feed distributor for the first set of feed distributors 132. In one embodiment, feedstock may be injected through one or more orifices, or openings, 202 usually near or on the first distributor tip 135 of the first set of feed distributors 132. Preferably, a plurality of openings 202 are on the end of the tip 135, arranged in a circular or oval pattern. In addition, multiple circular or oval patterns of openings 202 may be used on one tip 135 of the first set of feed distributors 132. Any other suitable pattern may be used on the tip 135. In an exemplary embodiment, the second set of feed distributors 134 may have the same configuration as shown in FIG. 5. The configuration of the first set of feed distributors 132 and the second set of feed distributors 134 may be the same. Alternatively, the first set of feed distributors 132 and the second set of feed distributors 134 may have different configurations depending upon their respective feeds. Referring back to FIG. 2, in an exemplary embodiment, the first set of feed distributors 132 may have a first set of openings on the first tips 135 and the second set of feed distributors 134 may have a second set of openings on the second tips 137 for injecting their respective feeds into the riser.

In one embodiment, a riser may have a nozzle 224 which engages a distributor barrel 230 by a barrel body flange 232. The distributor barrel 230 receives inert dispersion media such as steam from a dispersion media inlet pipe 234 and oil through an oil inlet pipe 236, secured to the oil inlet flange 238 by bolts. The oil inlet pipe 236 is in fluid communication with the feed lines to supply feed to the feed distributors. Oil inlet pipe 236 may receive feed from feed lines 131 and 133. Oil from the feed lines may pass through an internal oil pipe 240 and over vanes 242, causing the oil to swirl before combining with the dispersion media and exiting through the openings 202 in the tip 135.

Figure 6:
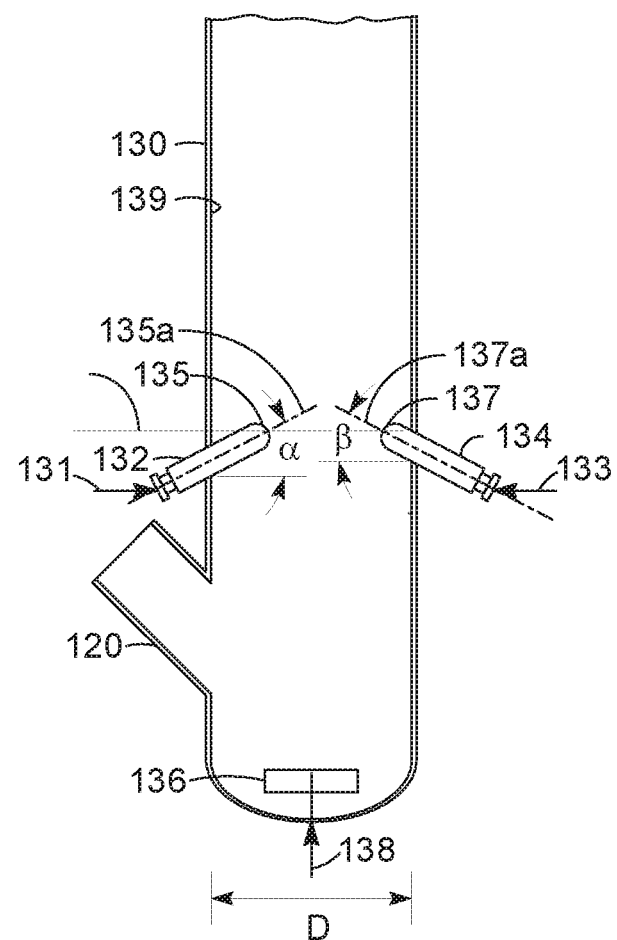
FIG. 6 is a partial sectional view of a riser in accordance with an exemplary embodiment.

As shown in FIG. 6, the first set of feed distributors 132 and second set of feed distributors 134 may be penetrate the wall 139 of the riser 130 at different elevations but with the openings of their respective tips 135 and 137 positioned at the same vertical elevation. The point of reference for tips 135 and 137 for determining the same elevation and the radial position may be the center of the respective tips 135 and 137. The center of the tip is the point at which a centerline 135a and a centerline 137a extending axially through the respective tip 135 and 137 intersect the outer surface of the tip. A respective centerline 135a, 137a of the tips 135 and 137 respectively intersect an outer surface of the respective tip at the same elevation with some margin. In an exemplary embodiment, the center of each of the first distributor tips 135 and the second distributor tips 137 may be vertically spaced from each other by no more than about the inner diameter D of the riser 130 at the elevation of the feed distributors 132 and 134. In another exemplary embodiment, the center of each of the first distributor tips 135 and the second distributor tips 137 may be vertically spaced from each other by no more than about 60% of the inner diameter D of the riser 130 at the elevation of the feed distributors 132 and 134. In yet another exemplary embodiment, the center of each of the first distributor tips 135 and the second distributor tips 137 may be vertically spaced from each other by no more than about 40% of the inner diameter D of the riser 130 at the elevation of the feed distributors 132 and 134. The vertical spacing of the feed distributor tips 135 and 137 from each other of no more than about the inner diameter D can still derive the advantages of the current arrangement. Typically, the centerline 135a and the centerline 137a through the tips 135 and 137 will be collinear with an axial line through the feed distributor 132 and 134, respectively. Segment "H" demonstrates the same elevation of feed distributor tips 135 and 137 in FIG. 6.

Feed distributors 132 and 134, or their respective centers as shown in FIG. 6, may be oriented at angles α or β upwardly from horizontal. Feed distributors 132 and 134 may have a pattern of openings on respective tips 135 and 137 that inject their respective feed in a spray pattern that defines respective centerlines 135a and 137a. Alternatively or additionally to the orientation of the feed distributors, the centerlines 135a and 137a of spray patterns may be oriented at angles α or β upwardly from horizontal. In an exemplary embodiment, the angles α or β are each between about 15 and about 60 degrees upward from the horizon. In another exemplary embodiment, the angles α or β are each between about 20 and about 40 degrees upward from the horizon. Lift gas in line 138 may be introduced into riser 130 from the bottom through the feed distributor 136.

Referring to FIG. 1, the first feed in line 131 may be injected through the first distributor tips 135 of the first set of feed distributors 132 and the second feed in line 133 may be injected through the second distributor tips 137 of the second set of feed distributors 134 into the riser 130. The injected first feed and the second feed mix with a fluidized bed of the FCC catalyst and move up into the riser 130 and enters the reactor 140.

In the reactor 140, the blended catalyst and reacted feed vapors are then discharged from the top of the riser 130 through the riser outlet 142 and separated into a cracked product vapor stream and a collection of catalyst particles covered with substantial quantities of coke and generally referred to as "coked catalyst." A swirl arm arrangement 144, provided at the end of the riser 130, may further enhance initial catalyst and cracked hydrocarbon separation by imparting a tangential velocity to the exiting catalyst and cracked product vapor stream mixture. The swirl arm arrangement 144 is located in an upper portion of a separation chamber 146, and a stripping zone 148 is situated in the lower portion of the separation chamber 146. Catalyst separated by the swirl arm arrangement 144 drops down into the stripping zone 148.

The cracked product vapor stream comprising cracked hydrocarbons including gasoline and some catalyst may exit the separation chamber 146 via a gas conduit 150 in communication with cyclones 152. The cyclones 152 may remove remaining catalyst particles from the product vapor stream to reduce particle concentrations to very low levels. The product vapor stream may exit the top of the reactor 140 through a product outlet 154. Catalyst separated by the cyclones 152 returns to the reactor 140 through diplegs into a dense bed 156 where catalyst will pass through chamber openings 158 and enter the stripping zone 148. The stripping zone 148 removes adsorbed and entrained hydrocarbons from the catalyst by counter-current contact with steam over the optional baffles 149. Steam may enter the stripping zone 148 through a line 147. A coked catalyst conduit 143 transfers coked catalyst to a regenerator 110.

As shown in FIG. 1, the regenerator 110 receives the coked catalyst and typically combusts the coke from the surface of the catalyst particles by contact with an oxygen-containing gas. The oxygen-containing gas may be introduced into the regenerator 110 via line 102 from the bottom of the regenerator 110. As shown, the oxygen-containing gas in line 102 enters the bottom of the regenerator 110 via a regenerator distributor 104. In an exemplary embodiment, an air stream in line 102 may be passed to the regenerator 110 as oxygen-containing gas. Typically, flue gases pass upwardly through the regenerator 110. A primary separator, such as a tee disengager 114, initially separates catalyst from the flue gas. Regenerator cyclones 116, or other means, may remove entrained catalyst particles from the rising flue gas before the flue gas exits the vessel through an outlet 118. Combustion of coke from the catalyst particles raises the temperatures of the catalyst. The catalyst may pass, regulated by a control valve, through a regenerator standpipe 120 which communicates with the bottom portion of riser 130.

In the FCC process a lift gas such as steam may be passed into the riser 130 to contact and lift the catalyst in the riser 130 to the feed point. Regenerated catalyst from the regenerator standpipe 120 will usually have a temperature in a range from about 649° C. to about 760° C. (1200° F. to 1400° F.). The dry air rate to the regenerator may be between about 3.6 kg/kg coke to about 6.3 kg/kg coke (8 lbs/lb coke to about and 14 lbs/lb coke). The hydrogen in coke may be between about 4 wt % to about 8 wt %, and the sulfur in coke may be between about 0.6 wt % to about 3.0 wt %. Catalyst coolers on the regenerator may be used. Additionally, the regenerator may be operated under partial CO combustion conditions. Conversion is defined by conversion to gasoline and lighter products with 90 vol % of the gasoline product boiling at or below 193° C. (380° F.) using ASTM D-86. The conversion may be between about 55 to about 90 vol % as produced.

The zeolitic molecular sieves used in typical FCC gasoline mode operation may have a large average pore size. Molecular sieves with a large pore size may have pores with openings of greater than 0.7 nm in effective diameter defined by greater than 10 and typically 12 membered rings. The large pore molecular sieves may include synthetic zeolites such as X-type and Y-type Zeolites, mordenite and Faujasite. In an exemplary embodiment, Y-type Zeolites with low rare earth content may be used as large pore molecular sieve. Low rare earth content denotes less than or equal to about 1.0 wt % rare earth oxide on the zeolitic portion of the catalyst. Catalyst additives may be added to the catalyst composition during operation.

In one embodiment, the fluidized catalyst may be accelerated by lift gas from the distributor 136 in a lower end of the riser 130 to reach the distributors 132 and 134.

The riser 130 may operate with a catalyst to oil ratio of between about 2 to about 20, or between about 4 to about 16. Steam to the riser 130 may be between about 3 wt % to about 20 wt % of the total hydrocarbon feed, or between about 4 wt % to about 12 wt %. Before contacting the catalyst, the raw oil feed may have a temperature in a range of from about 149° to about 427° C. (300 to 800° F.), or between about 204° to about 288° C. (400° and 550 F). The riser 130 may operate at a temperature range of between about 427° to about 649° C. (800° and 1200° F.), or between about 482° to about 593° C. (900° and 1100° F.). The pressure in the riser 130 may be between about 103 to about 241 kPa (gauge) (15 and 35 psig), or about 138 kPa (gauge) (20 psig). The feed pressure drop across the feed distributor 134 may be between about 69 and about 690 kPa (gauge) (10 and 100 psig), or about 205 to about 415 kPa (gauge) (30 and 60 psig). The steam on hydrocarbon feed from the distributor may be between about 0.5 and about 7 wt %, and preferably between about 1 and 6 wt %.

Example

A second feed comprising butenes and butanes was supplied in line 133. A first feed comprising light naphtha olefins and paraffins was supplied in line 131. The second feed of butenes and butanes was injected through the second distributor tips 137 of the second set of feed distributors 134 into the outer annular region of the riser 130. The first feed of light naphtha olefins and paraffins was injected through the first distributor tips 135 the first set of feed distributors 132 into the inner center region of the riser 130 at the same elevation as the second feed. The outer annular region had a 20% lower velocity and higher catalyst density compared to the inner center region of the riser 130. Olefin cracking for segmented feeding of the first feed and the second feed was compared with a base case wherein the first feed and the second feed were mixed and thereafter passed to the riser 130. Results of the segmented feeding and the base case are tabulated in Table 1 below.

| S. No. | | Segmented Feed Delta Increase |
|---|---|---|
| 1. | Butene Partial Pressure | +38% |
| 2. | Butene Residence time | +20% |
| 3. | Butene conversion | +160% |
| 4. | Pentene conversion | +28% |
| 5. | Propene yield | +13.8% |

Segmented feeding of butenes and butanes to the outer annular region and light naphtha olefins and paraffins to the inner center region at the same elevation provided improved yield compared to the base. Feeding the second feed of butenes and butanes to the outer annular region of higher severity provided higher residence time to the butenes and butanes for cracking in the higher severity region which provided improved cracking of the feed. Thus, provided improved butene conversion. Simultaneously, passing the first feed of light naphtha olefins and paraffins to the inner center region of low severity provided improved pentene conversion. Overall, segmented feeding provided higher conversion and yield compared to the base case.

Specific Embodiments

While the following is described in conjunction with specific embodiments, it will be understood that this description is intended to illustrate and not limit the scope of the preceding description and the appended claims.

A first embodiment of the present disclosure is an FCC process for cracking multiple feedstocks in an FCC apparatus comprising a riser, the riser comprising a first set of feed distributors having first distributor tips and a second set of feed distributors having second distributor tips positioned around the perimeter of the riser, the process comprising injecting from the distributor tips of the first set of feed distributors, a first feed into the riser; injecting from the second distributor tips of the second set of feed distributors, a second feed into the riser, wherein the first distributor tips are positioned at a first radius in the riser and the second distributor tips are positioned at a second radius in the riser; and cracking the first feed and the second feed in the riser in the presence of an FCC catalyst to provide a cracked effluent stream. An embodiment of the present disclosure is one, any or all of prior embodiments in this paragraph up through the first embodiment in this paragraph, wherein the second distributor tips are spaced apart from the first distributor tips at a vertical distance of no more than about an inner diameter of the riser. An embodiment of the present disclosure is one, any or all of prior embodiments in this paragraph up through the first embodiment in this paragraph, wherein the first distributor tips are located into a region of lower catalyst density in the riser and the second distributor tips are located into a region of higher catalyst density region in the riser. An embodiment of the present disclosure is one, any or all of prior embodiments in this paragraph up through the first embodiment in this paragraph, wherein the region of lower catalyst density is an inner center region in the riser and the region of higher catalyst density is an outer annular region in the riser. An embodiment of the present disclosure is one, any or all of prior embodiments in this paragraph up through the first embodiment in this paragraph, wherein the first radius is smaller than the second radius. An embodiment of the present disclosure is one, any or all of prior embodiments in this paragraph up through the first embodiment in this paragraph, wherein the second feed is less crackable than the first feed. An embodiment of the present disclosure is one, any or all of prior embodiments in this paragraph up through the first embodiment in this paragraph further comprising a third set of feed distributors having a third distributor tips positioned around the perimeter of the riser for injecting a third feed into the riser, wherein the third distributor tips of the third set of feed distributors for injecting the third feed into the riser are positioned at a higher elevation around the perimeter of the riser than the first distributor tips and the second distributor tips. An embodiment of the present disclosure is one, any or all of prior embodiments in this paragraph up through the first embodiment in this paragraph, wherein the third feed is selected from one or more of light vacuum gas oil, and unconverted oil. An embodiment of the present disclosure is one, any or all of prior embodiments in this paragraph up through the first embodiment in this paragraph further comprising a set of center feed distributors positioned at a lower elevation than the first set of feed distributors and the second set of feed distributors, wherein one or more of heavy cycle oil, main column bottoms, and deasphalted oil is passed through the center feed distributors into the riser. An embodiment of the present disclosure is one, any or all of prior embodiments in this paragraph up through the first embodiment in this paragraph, wherein the first feed and the second feed are selected from a group comprising heavy vacuum gas oil and heavy cycle oil, heavy vacuum gas oil and main column bottoms, heavy vacuum gas oil and deasphalted oil, naphtha and C4 olefins, C5 hydrocarbons and C4 hydrocarbons, and vacuum gas oil and hydrocarbon resid stream respectively.

A second embodiment of the present disclosure is an FCC process for cracking multiple feedstocks in an FCC apparatus comprising a riser, the process comprising injecting from first distributor tips of a first set of feed distributors positioned around a perimeter of the riser, a first feed into a region of lower catalyst density in the riser; injecting from second distributor tips of a second set of feed distributors positioned around the perimeter of the riser, a second feed into a region of higher catalyst density in the riser, wherein the second distributor tips are spaced apart from the first distributor tips at a vertical distance of no more than about an inner diameter of the riser; and cracking the first feed and the second feed in the riser in the presence of an FCC catalyst to provide a cracked effluent stream. An embodiment of the present disclosure is one, any or all of prior embodiments in this paragraph up through the second embodiment in this paragraph, wherein the region of lower catalyst density is an inner center region in the riser and the region of higher catalyst density is an outer annular region in the riser. An embodiment of the present disclosure is one, any or all of prior embodiments in this paragraph up through the second embodiment in this paragraph, wherein the first feed and the second feed are selected from a group comprising heavy vacuum gas oil and heavy cycle oil, heavy vacuum gas oil and main column bottoms, heavy vacuum gas oil and deasphalted oil, naphtha and C4 olefins, C5 hydrocarbons and C4 hydrocarbons, and vacuum gas oil and hydrocarbon resid stream. An embodiment of the present disclosure is one, any or all of prior embodiments in this paragraph up through the second embodiment in this paragraph, wherein the second feed is less crackable than the first feed. An embodiment of the present disclosure is one, any or all of prior embodiments in this paragraph up through the second embodiment in this paragraph, wherein the first distributor tips are positioned at a first radius in the riser and the second distributor tips are positioned at a second radius in the riser. An embodiment of the present disclosure is one, any or all of prior embodiments in this paragraph up through the second embodiment in this paragraph, wherein the first radius is smaller than the second radius.

A third embodiment of the present disclosure is an FCC process apparatus, comprising a riser comprising; a first set of feed distributors positioned around a perimeter of the riser, the first set of feed distributors in communication with a first feed line and having first distributor tips for injecting a first feed into the riser; a second set of feed distributors positioned around a perimeter of the riser, the second set of feed distributors in communication with a second feed line separate from the first feed line and having second distributor tips for injecting a second feed into the riser; wherein the first feed line is in downstream communication with a first feed source and the second feed is in downstream communication with a second feed source; and a regenerator having a regenerator standpipe connected to a bottom portion of the riser. An embodiment of the present disclosure is one, any or all of prior embodiments in this paragraph up through the third embodiment in this paragraph, wherein the second distributor tips are spaced apart from the first distributor tips at a vertical distance of no more than about an inner diameter of the riser. An embodiment of the present disclosure is one, any or all of prior embodiments in this paragraph up through the third embodiment in this paragraph further comprising a third set of feed distributors having a third distributor tips positioned around the perimeter of the riser for injecting a third feed into the riser, wherein the third distributor tips of the third set of feed distributors for injecting the third feed into the riser are positioned at a higher elevation around the perimeter of the riser than the first distributor tips and the second distributor tips. An embodiment of the present disclosure is one, any or all of prior embodiments in this paragraph up through the third embodiment in this paragraph further comprising a set of center feed distributors positioned at a lower elevation than the first set of feed distributors and the second set of feed distributors, wherein one or more of heavy cycle oil, main column bottoms, and deasphalted oil is passed through the center feed distributors into the riser. An embodiment of the present disclosure is one, any or all of prior embodiments in this paragraph up through the third embodiment in this paragraph, wherein the first distributor tips are positioned at a first radius in the riser and the second distributor tips are positioned at a second radius in the riser. An embodiment of the present disclosure is one, any or all of prior embodiments in this paragraph up through the third embodiment in this paragraph, wherein the first radius is smaller than the second radius.

Without further elaboration, it is believed that using the preceding description that one skilled in the art can utilize the present disclosure to its fullest extent and easily ascertain the essential characteristics of this present disclosure, without departing from the spirit and scope thereof, to make various changes and modifications of the present disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A fluid catalytic cracking process for cracking multiple feedstocks in a fluid catalytic cracking apparatus comprising:
   a riser, the riser comprising a first set of feed distributors having first distributor tips and a second set of feed distributors having second distributor tips positioned around the perimeter of the riser, the process comprising:
   injecting from the first distributor tips of the first set of feed distributors, a first feed into the riser;
   injecting from the second distributor tips of the second set of feed distributors, a second feed into the riser,
   wherein the first distributor tips are positioned at a first radius in the riser and the second distributor tips are positioned at a second radius with respect to a center point of the riser;
   wherein the second distributor tips are spaced apart from the first distributor tips at a vertical distance of no more than about an inner diameter of the riser and the first distributor tips are located in a region of a first catalyst density in the riser and the second distributor tips are located in a region of a second catalyst density in the riser, the first catalyst density and the second catalyst density being different; and
   cracking the first feed and the second feed in the riser in the presence of a fluid catalytic cracking catalyst to provide a cracked effluent stream.

2. The process of claim 1, wherein the first distributor tips are located into a region of lower catalyst density in the riser and the second distributor tips are located into a region of higher catalyst density in the riser.

3. The process of claim 2, wherein the region of lower catalyst density is an inner center region in the riser and the region of higher catalyst density is an outer annular region in the riser.

4. The process of claim 1, wherein the first radius is smaller than the second radius.

5. The process of claim 1, wherein the second feed is less crackable than the first feed.

6. The process of claim 1 further comprising a third set of feed distributors having third distributor tips positioned around the perimeter of the riser for injecting a third feed into the riser, wherein the third distributor tips of the third set of feed distributors for injecting the third feed into the riser are positioned at a higher elevation around the perimeter of the riser than the first distributor tips and the second distributor tips.

7. The process of claim 6, wherein the third feed is selected from one or more of light vacuum gas oil, and unconverted oil.

8. The process of claim 1 further comprising a set of center feed distributors positioned at a lower elevation than the first set of feed distributors and the second set of feed distributors, wherein one or more of heavy cycle oil, main column bottoms, and deasphalted oil is passed through the center feed distributors into the riser.

9. The process of claim 1, wherein the first feed and the second feed comprise pairs selected from a group consisting of: heavy vacuum gas oil and heavy cycle oil, heavy vacuum gas oil and main column bottoms, heavy vacuum gas oil and deasphalted oil, naphtha and C4 olefins, C5 hydrocarbons and C4 hydrocarbons, and vacuum gas oil and hydrocarbon resid.

10. A fluid catalytic cracking process for cracking multiple feedstocks in a fluid catalytic cracking apparatus comprising a riser, the process comprising:
   injecting from first distributor tips of a first set of feed distributors positioned around a perimeter of the riser, a first feed into a region of lower catalyst density in the riser;
   injecting from second distributor tips of a second set of feed distributors
   positioned around the perimeter of the riser, a second feed into a region of higher catalyst density in the riser,
   wherein the second distributor tips are spaced apart from the first distributor tips at a vertical distance of no more than about an inner diameter of the riser; and
   cracking the first feed and the second feed in the riser in the presence of a fluid catalytic cracking catalyst to provide a cracked effluent stream.

11. The process of claim 10, wherein the region of lower catalyst density is an inner center region in the riser and the region of higher catalyst density is an outer annular region in the riser.

12. The process of claim 10, wherein the first feed and the second feed comprise pairs selected from a group consisting of: heavy vacuum gas oil and heavy cycle oil, heavy vacuum gas oil and main column bottoms, heavy vacuum gas oil and deasphalted oil, naphtha and C4 olefins, C5 hydrocarbons and C4 hydrocarbons, and vacuum gas oil and hydrocarbon resid.

13. The process of claim 10, wherein the second feed is less crackable than the first feed.

14. The process of claim 10, wherein the first distributor tips are positioned at a first radius in the riser and the second distributor tips are positioned at a second radius in the riser.

15. The process of claim 14, wherein the first radius is smaller than the second radius.

16. A fluid catalytic cracking process for cracking multiple feedstocks in a fluid catalytic cracking apparatus comprising:
   a riser, the riser comprising a first set of feed distributors having first distributor tips and a second set of feed distributors having second distributor tips positioned around the perimeter of the riser, the process comprising:
   injecting from the first distributor tips of the first set of feed distributors, a first feed into the riser;
   injecting from the second distributor tips of the second set of feed distributors, a second feed into the riser,
   wherein the first distributor tips are positioned at a first radius in the riser and the second distributor tips are positioned at a second radius with respect to a center point of the riser,
   wherein the first distributor tips are located in a region of a lower catalyst density in the riser and the second distributor tips are located in a region of a higher catalyst density in the riser; and
   cracking the first feed and the second feed in the riser in the presence of a fluid catalytic cracking catalyst to provide a cracked effluent stream.

17. The process of claim 16, wherein the second distributor tips are spaced apart from the first distributor tips at a vertical distance of no more than about an inner diameter of the riser.

18. The process of claim 16, wherein the first radius is smaller than the second radius.

19. The process of claim 16, wherein the second feed is less crackable than the first feed.

20. The process of claim 16 further comprising a third set of feed distributors having a third distributor tips positioned around the perimeter of the riser for injecting a third feed into the riser, wherein the third distributor tips of the third set of feed distributors for injecting the third feed into the riser are positioned at a higher elevation around the perimeter of the riser than the first distributor tips and the second distributor tips.

* * * * *